United States Patent Office 3,435,004
Patented Mar. 25, 1969

3,435,004
NITROGENOUS POLYMERS PREPARED FROM ESTERS OF AROMATIC TETRACARBOXYLIC ACID DERIVATIVES AND AROMATIC TETRAMINES
Clayton E. Hathaway, Jr., and Ralph E. De Brunner, Kettering, and John Mann Butler, Dayton, Ohio, assignors to Monsanto Research Corporation, St. Louis, Mo.
No Drawing. Filed July 27, 1966, Ser. No. 568,130
Int. Cl. C08g 20/32
U.S. Cl. 260—65
10 claims

ABSTRACT OF THE DISCLOSURE

Process of preparing nitrogenous polymers by contacting (a) ester obtained from the reaction of an aromatic dianhydride, tetraacid or ester derivative with a glycol or glycol monoether with (b) an aromatic tetramine, and curing at 100–525° C.

This invention relates to nitrogenous polymeric products, and to the method of preparing them. More particularly, the invention provides new and valuable polymers having high thermal and oxidative stability, and molded objects and protective coatings obtained therefrom.

It is well known that thermally stable polymers are useful for the protection of surfaces from heat and chemical attack, or as bonding materials for laminates and other composite structures. In the application of polymers as coating materials or as bonding agents for laminates and composite structures it is desirable that the polymers may be applied in solution. Not only is application simplified, but there generally results a more uniform coating having better adhesion. Previous materials having otherwise desirable properties, e.g., thermal stability, have often shown undesirable solubility characteristics. A few have yielded solutions only with rare and expensive solvents, or by unconventional techniques, so that application from solution has been generally avoided. Also, when solutions have been obtained, gelling frequently occurs.

An object of the invention is the preparation of new and valuable polymers which can be applied as protective coatings by conventional techniques. A further object is to provide polymeric products which can be cured readily to yield solid polymers of high thermal stability and resistance to chemical attack. Still a further object is the provision of laminates and composite structures employing the polymeric products as bonding agents.

These and other objects hereinafter defined are provided by the process of this invention which comprises forming an ester-tetramine reaction product by contacting (a) an ester obtained by heating together a tetracarboxy compound of the formula

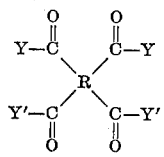

where R is an aromatic radical having from 6 to 20 carbon atoms, is free of olefinic and acetylenic unsaturation and of substituents which react with the amine radical in preference to a radical containing the

linkage; wherein Y and Y' taken separately are selected from the class consisting of —OH, —O—alkyl of from 1 to 8 carbon atoms and —O—aryl of from 6 to 8 carbon atoms and wherein Y and Y' when taken together stand for —O—; and wherein one pair of the radicals

and

is positioned at a first pair of non-tertiary, nuclear carbon atoms which are immediately consecutive and wherein the other pair of the radicals

and

is positioned at a second pair of non-tertiary nuclear carbon atoms which are immediately consecutive, said second pair being separated from the first pair by at least one carbon atom; with a hydroxy alkylene compound of the formula HOR'OZ where R' is an alkylene radical having from 2 to 6 carbon atoms and Z is selected from the class consisting of hydrogen and hydrocarbyl having from 1to 8 carbon atoms; with (b) a tetramine of the formula

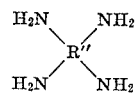

where R'' is a tetravalent aromatic radical of from 6 to 20 carbon atoms and free of olefinic and acetylenic unsaturation and of substituents which react with a radical containing the

linkage in preference to the amine radical, and having two amino groups positioned at a pair of non-tertiary, nuclear carbon atoms which are immediately consecutive, and two amino groups positioned at a second pair of non-tertiary, nuclear carbon atoms which are immediately consecutive, said first pair being separated from the second pair by at least one carbon atom; and subsequently curing the ester-tetramine reaction product at a temperature of 100° C. to 525° C. to obtain a solid nitrogenous polymer. There are provided coatings formed by curing the reaction product deposited on a substrate. There are also provided molded objects including composites, comprising the cured reaction product as the matrix.

The reactions which occur in the esterification step, in the formation of the reaction product, or in the curing step are not known with certainty. However, by way of illustration only, the following equations are suggested for the reactions which may possibly occur with pyromellitic dianhydride, ethylene glycol, and 3,3',4,4'-biphenyltetramine, reaction of the dianhydride with the glycol occuring as follows:

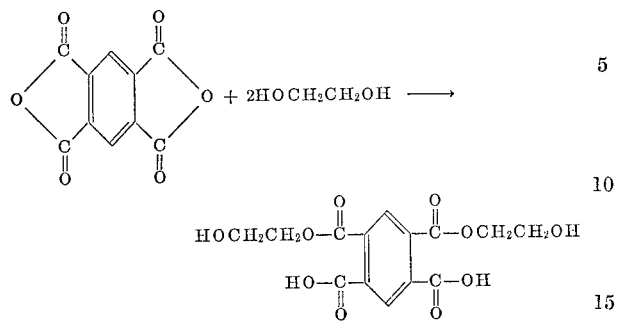

Esterification may result in several esters or mixtures thereof, but the diester is shown here merely for illustration. The ester may react with the tetramine as follows:

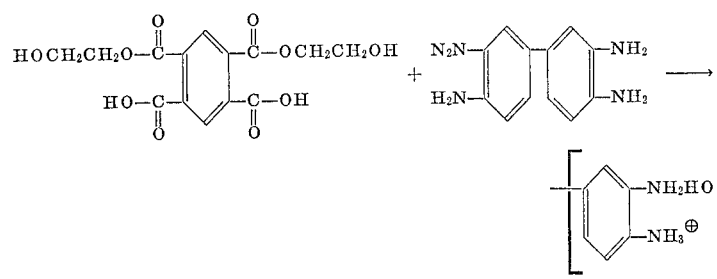

Upon heating during the curing step, the above depicted reaction product may lose water and ethylene glycol to form various other products in various proportions. Thus, by loss of water alone, under moderate heating, an intermediate polyamide may possibly be formed, represented by the formula

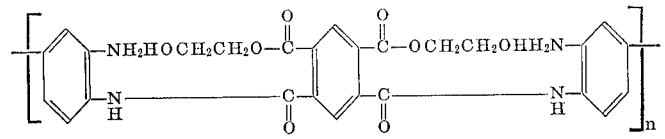

where $n$ represents the degree of polymerization. Such an intermediate may undergo intramolecular cyclization to form the final nitrogenous polymer. The cured polymer may thus contain, but is not limited to, a repeating unit as follows:

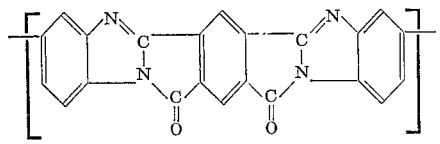

thus having the benzimidazo-1-isoindolinone moiety:

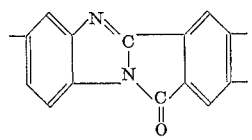

Examples of the presently useful aromatic tetracarboxy compounds, in addition to the 1,2,4,5-benzenetetracarboxylic 1,2:4,5-dianhydride which is disclosed above, are 1,4,5,8-naphthalenetetracarboxylic acid; 4-nitro-1,2,5,6-naphthalenetetracarboxylic 1,2:5,6-dianhydride; 3,3′,4,4′-biphenyltetracarboxylic acid; 2,2′-dimethoxy-3,3′,4,4′-biphenyltetracarboxylic 3,4:3′,4′ - dianhydride, 2,2′,3,3′-diphenyltetracarboxylic 2,3:2′,3′ - dianhydride; 3,6-dimethoxy - 1,2,4,5 - benzenetetracarboxylic dianhydride; 2,2′,5,5′ - tetramethyl - 3,3′,4,4′ - biphenyltetracarboxylic acid; 3,4,9,10 - perylenetetracarboxylic 3,4:9,10 - dianhydride; 1,8,9,10 - phenanthrenetetracarboxylic 1,10:8,9 - dianhydride; 3,3′,4,4′-benzophenonetetracarboxylic 3,4:3′,4′-dianhydride, 2,2-bis(2,3-dicarboxyphenyl)propane 2,3:2′,3′-dianhydride; 4,4′ - oxybis(phthalic anhydride); 4,4′-sulfonylbis(phthalic anhydride); 2,2′ - dichloro-3,3′,4,4′-biphenyltetracarboxylic acid; tetramethyl 2,2′,3,3′-biphenyltetracarboxylate, tetraethyl 1,2,4,5 - benzenetetracarboxylate, tetrabutyl 3,3′,4,4′ - benzophenonetetracarboxylate, etc. The preferred compounds are 1,2,4,5-benzenetetracarboxylic acid and the anhydrides and lower alkyl esters thereof, e.g., compounds of the structure

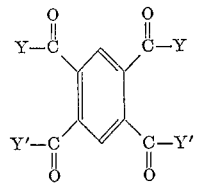

wherein Y, and Y′ taken separately are selected from the class consisting of —OH, —O—alkyl of from 1 to 8 carbon atoms or —O—aryl of from 6 to 8 carbon atoms and wherein Y and Y′ when taken together stand for —O—.

There may be used either the free tetracarboxylic acid, the dianhydride thereof or esters thereof because, under the reaction conditions, these react with the hydroxyalkylene compound to give an ester and coformed by-products including water or an alkanol or a phenol. Examples of the useful esters include simple and mixed, complete or partial, esters such as tetramethyl, tetraisopropyl, tetrapentyl, dibutyl, tetraoctyl, tetraphenyl, tetraxylyl, diethyl dipropyl or dimethyl diphenyl 1,2,4,5-benzenetetracarboxylate or the partial esters of 1,2,4,5-benzenetetracarboxylic acid with alkanols or phenols such as the mono-, di-, or tri-esters of said acid and ethanol, butanol or phenol.

Examples of hydroxy alkylene compounds which may be employed, besides ethylene glycol, are 1,2-propanediol; 1,3-propanediol; 1,2-butanediol; 1,4-butanediol; 1,3-pentanediol; 1,5-pentanediol; 1,2-hexanediol; 1,4-hexanediol; 1,6-hexanediol; 2-methoxyethanol; 2-butoxyethanol; 3-methoxy-1-propanol; 2 - ethoxy - 1 - propanol; 2-methoxy-1-butanol; 3-propoxy-2-butanol; 4-ethoxy-1-butanol; 5-methoxy - 1 - pentanol; 6-methoxy-1-hexanol; 2-phenoxyethanol; 2-(2-tolyloxy)ethanol; 2 - (2,3 - xylenyloxy)ethanol; and 3-phenoxy-1-propanol. The preferred hydroxy alkylene compounds are those in which R′ of the formula HOR′OZ is ethylene.

Examples of other aromatic tetramines which react as does biphenyltetramine in the preparation of the presently provided highly heat-resistant solid polymers are 1,2,4,5-benzenetetramine; 3,3′,4,4′-tetraminobenzophenone; 2,2′-diethyl-3,3′,4,4′-tetraaminobenzophenone; 4,4′-methylenebis(o-phenylenediamine); 4,4′ - ethylenebis(o-phenylenediamine); 4,4′-propylidenebis(o-phenylenediamine); 2,2′-dichloro - 3,3′,4,4′ - biphenyltetramine, 3,6-dimethoxy-1,2,4,5 - benzenetetramine; 4,4′ - isopropylidenebis(3-nitro-o-phenylenediamine); 4,4′ - oxybis(o - phenylenediamine);

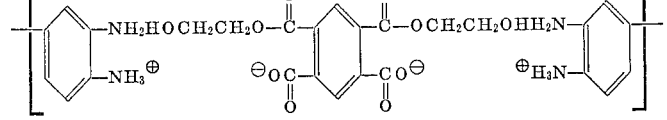

4,4′-sulfonylbis(o-phenylenediamine), 3,4,9,10-perylenetetramine, 3,3′-dimethyl-4,5,4′,5′-biphenyltetramine, 1,4,5,8-naphthalenetetramine, 2,3,6,7-naphthalenetetramine, etc. The preferred tetramines are those containing at least two benzene rings and have the formula

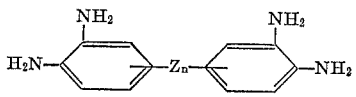

wherein $n$ is a number of 0 or 1, Z is —O—,

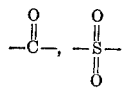

or alkylene of from 1 to 3 carbon atoms, and the two amine groups at each benzene ring are attached to adjacent carbon atoms.

In the reaction between the ester and the tetramine, two or more different tetramines or esters may be used; e.g., a mixture of an aromatic tetramine such as 1,2,4,5-benzenetetramine and a bis(diaminophenyl)alkane such as 1,2-bis(3,4-diaminophenyl)ethane may be reacted with a single ester such as that derived from the reaction of 1,2,4,5 - benzenetetracarboxylic 1,2:4,5-dianhydride with ethylene glycol or with a mixture of the same and the ester derived from 1,2,5,6-naphthalenetetracarboxylic acid and 2-methoxyethanol. Thereby there are obtained reaction products having different linkages dispersed more or less randomly in the polymer chain. Such an expedient is useful in tailoring polymer structures having properties intermediate to those attributable to the individual linkages.

Preparation of the presently provided polymers requires, first, the preparation of the ester, for example, by simply heating the tetracarboxylic compound with the hydroxy aliphatic compound at moderate temperatures, e.g., 50° C. to 200° C., thereafter contacting the ester with the tetramine at temperatures preferably below 100° C. and finally curing the reaction product at from 100° C. to 525° C. In the esterification step, the extent of heating depends upon the nature of the individual reactants and upon the contact time. Usually a lower temperature is required with the tetracarboxylic dianhydrides than with the less reactive tetraalkyl tetracarboxylate esters or acids. The tetraalkyl esters probably react with the hydroxy alkylene compounds by a transesterification reaction. Although esterification takes place readily in the absence of a catalyst, a catalyst may be employed, e.g., p-toluenesulfonic acid or the hydrogen form of a sulfonated styrene-divinylbenzene ion exchange resin. An inert, organic liquid medium may be employed for the esterification reaction. It is not necessary that the liquid be a solvent for the reactants at the temperature of the reaction; i.e., it may serve merely as a diluent. However, it is preferred that a medium be used in which at least one of the reactants is soluble. Examples of generally useful solvents include the N,N-dialkylcarboxamides such as dimethylformamide; the tertiary nitrogen heterocyclics such as pyridine or N-methyl-2-pyrrolidinone; the dihydrocarbyl sulfones such as dimethyl sulfone, etc. Conveniently, an excess amount of the hydroxy alkylene compound, e.g., glycol or hydroxy ether, may be employed in the esterification reaction and serve as a solvent.

The reaction of the ester with the tetramine may be done without isolating the ester from the esterification reaction mixture in the organic liquid medium. The reaction components may be merely mixed together at ordinary or moderately increased temperatures. In some cases, heating at up to 100° C. may be required. Generally, however, heating is unnecessary. With very reactive amines the reaction may be exothermic; so that cooling is employed to avoid overheating. The resulting ester-tetramine reaction product may be soluble in the organic liquid medium, in which case it may be used as a varnish for coating surfaces or in bonding laminates. If desired, the organic solvent may be removed partially or entirely by volatilization at ordinary or reduced pressure. Either the fluid concentrate obtained by removing only part of the solvent, or the solvent-free residue may be used for the preparation of laminates or other composites. Where the solvent-free reaction product is desired, it may also be conveniently prepared by reacting the ester and the tetramine in an inert liquid medium which is a solvent for the reactants but a non-solvent for the reaction product. When the liquid medium dissolves the reactants and the reaction product, the latter may be recovered by precipitation from a medium which is a non-solvent for the reaction product but which does dissolve any unreacted starting material.

Curing the reaction product obtained from the ester and the tetramine results in the formation of a nitrogenous polymer. Curing may be at from 100° C. to 525° C. and is conducted either in air or in an inert atmosphere, e.g., nitrogen, argon, carbon dioxide or vacuum. When employing temperatures which are substantially within the 525° C. maximum, at which temperatures oxidative attack may be expected, an inert atmosphere is preferred.

In a coating application, a suspension or solution of the reaction product from the esterification product and the tetramine, with or without pigments such as titanium dioxide, zinc oxide, silica, alumina, iron oxide, etc is preferably deposited upon the substrate and the diluent or solvent is evaporated from the substrate. Curing is then conducted by heating the substrate, with its deposit of dried coating, at a temperature of up to 500° C. when curing is conducted in air and at up to about 525° C. when it is conducted in an inert atmosphere. The maximum curing temperature will depend upon such conditions as time and atmosphere, as well as upon the nature of the substrate. Generally, a lower curing temperature will require longer curing time, and cellulosic substrates will not tolerate the high temperatures to which most metallic and ceramic substrate can be subjected without deterioration. In experimental runs, the coated substrate will be maintained at the maximum temperature permitted by the substrate for a time of about a few minutes to several hours in order to assure completion of curing. This point can be readily ascertained in experimental runs by noting substantial cessation in weight change. The well cured film will be smooth, adherent and tough.

For the preparation of laminates, there may be employed either the dried, finely comminuted ester-tetramine reaction product, or a solution, or suspension thereof in a readily volatilizable, inert liquid medium. The substantially dry but fusible reaction product or a concentrate thereof is preferred in order to obtain bubble-free, continuous, tenacious bonding. Other composites may be similarly prepared, employing with the polymer either filaments or textiles of glass, silica, boron, etc. The polymer is generally useful as an adhesive for bonding together metal, glass, plastics, and other materials of construction.

For compression molding the reaction mixture is freed of solvent to give a hard, brittle solid which is amenable to conventional molding techniques. Curing of the molded article is advantageously conducted in the mold.

The presently provided nitrogen-containing polymers are generally hard solids which may be finely comminuted for compression molding or employed in conjunction with solvents and/or diluents in coating and impregnating applications. They are of particular interest after they have been cured as hereinbefore described. The cured products may be heated to about 500° C., in air and higher in an inert atmosphere without substantial weight loss, and they resist attack by liquids which dissolve or soften the reaction products from which they are obtained.

The invention is further illustrated by, but not limited to, the following examples.

Example 1

A mixture of 12.81 g. (0.04 mole) of 3,3',4,4'-benzophenonetetracarboxylic 3,4:3',4'-dianhydride and 31.12 g. (0.5 mole) of ethylene glycol was stirred and heated at about 110° C. for 2 hours, to dissolve the solids. The solution was cooled to room temperature and to it was added, while stirring, 8.57 g. (0.04 mole) of 3,3',4,4'-biphenyltetramine in small portions. The temperature was maintained below 30° C. by cooling. The product was obtained as a viscous polymeric solution.

Pieces of glass cloth were impregnated with the polymeric solution, heated at 50° C. with evacuation to remove solvent, laid in a pile and then heated under 120 lbs. per sq. in. pressure at 149° C. for 30 minutes and at 274° C. for 30 minutes. A firmly bonded laminate was obtained.

Example 2

A mixture of 8.72 g. (0.04 mole) of 1,2,4,5-benzenetetracarboxylic 1,2:4,5-dianhydride and 31.12 g. (0.4 mole) of ethylene glycol was stirred and heated at about 110° C. for 0.5 hour, to dissolve the solids. The solution was cooled to 20° C. and to it was added while stirring, 8.57 g. (0.04 mole) of 3,3',4,4'-biphenyltetramine in small portions. The temperature was maintained below 30° C. by cooling. The viscous polymeric product was soluble in 133 ml. of warm dimethyl acetamide.

Pieces of glass cloth were impregnated with the polymeric solution, heated at 50° C. with evacuation to remove solvent, laid in a pile and then heated under 120 p.s.i. pressure at 149° C. for 30 minutes and at 274° C. for 35 minutes. A firmly bonded laminate was obtained, showing no softening at 360° C. in air.

Example 3

A mixture of 10.72 g. (0.04 mole) of 1,4,5,8-naphthalenetetracarboxylic acid and 70.2 g. (1.13 mole) of ethylene glycol was stirred and heated at about 110–195° C. for a number of hours in the presence of 3 grams of a sulfonated styrene-divinylbenzene cation exchange resin to effect clear solution. The resin was removed by filtration. The solution was cooled to room temperature and to it was added, with stirring, 8.57 g. (0.04 mole) of 3,3',4,4'-biphenyltetramine in small portions. The temperature was maintained below 30° C. by cooling. The polymeric product was isolated from the solution by adding methanol, thereby obtaining a moldable thermosetting product. The solid polymer softened at 135–150° C. and set irreversibly to a hard solid at about 270° C. It was useful for molding buttons and knobs.

Example 4

A mixture of 12.81 g. (0.04 mole) of 3,3',4,4'-benzophenonetetracarboxylic 3,4:3',4'-dianhydride and 9.92 g. (0.13 mole) of 2-methoxyethanol was stirred and heated at 110° C. for 45 minutes to dissolve the solids. The solution was cooled to room temperature and to it was added, with stirring, 21.2 g. (0.28 mole) of 2-methoxyethanol, and then 8.57 g. (0.04 mole) of 3,3',4,4'-biphenyltetramine in small portions over a period of 4 hours. The temperature was maintained below 30° C. by cooling. The viscous liquid product was useful for bonding layers of glass cloth in a laminate.

It is to be understood that although the invention has been described with specific reference to particular embodiments thereof, it is not to be so limited since changes and alterations therein may be made which are within the full intended scope of this invention as defined by the appended claims.

What is claimed is:

1. The process of forming a nitrogenous polymer which comprises forming an ester-tetramine reaction product by contacting (a) an ester obtained by heating together a tetracarboxy compound of the formula $$\begin{array}{c} Y-\overset{O}{\overset{\|}{C}} \diagdown \overset{}{\underset{R}{}} \diagup \overset{O}{\overset{\|}{C}}-Y \\ Y'-\overset{}{\underset{\|}{C}} \diagup \overset{}{} \diagdown \overset{}{\underset{\|}{C}}-Y' \\ \overset{}{\underset{O}{}} \overset{}{\underset{O}{}} \end{array}$$

where R is an aromatic radical having from 6 to 20 carbon atoms, is free of olefinic and acetylenic unsaturation and of substituents which react with the amine radical in preference to a radical containing the $$-\overset{O}{\overset{\|}{C}}-$$

linkage; wherein Y and Y' taken separately are selected from the class consisting of —OH, —O—alkyl of from 1 to 8 carbon atoms and —O—aryl of from 6 to 8 carbon atoms, and wherein Y and Y' when taken together stand for —O—; and wherein one pair of the radicals $$-\overset{O}{\overset{\|}{C}}-Y$$

and $$-\overset{O}{\overset{\|}{C}}-Y'$$

is positioned at a first pair of non-tertiary, nuclear carbon atoms which are immediately consecutive and wherein the other pair of the radicals $$-\overset{O}{\overset{\|}{C}}-Y \text{ and } -\overset{O}{\overset{\|}{C}}-Y'$$

is positioned at a second pair of non-tertiary nuclear carbon atoms which are immediately consecutive, said second pair being separated from the first pair by at least one carbon atom; with a hydroxyalkylene compound of the formula HOR'OZ where R' is an alkylene radical having from 2 to 6 carbon atoms and Z is selected from the class consisting of hydrogen and hydrocarbyl having from 1 to 8 carbon atoms; with (b) a tetramine of the formula $$\begin{array}{c} H_2N \diagdown \diagup NH_2 \\ \diagup R'' \diagdown \\ H_2N \diagup \diagdown NH_2 \end{array}$$

where R" is a tetravalent aromatic radical of from 6 to 20 carbon atoms and free of olefinic and acetylenic unsaturation and of substituents which react with a radical containing the $$-\overset{O}{\overset{\|}{C}}-$$

linkage in preference to the amine radical, and having two amino groups positioned at a pair of non-tertiary, nuclear carbon atoms which are immediately consecutive, and two amino groups positioned at a second pair of non-tertiary, nuclear carbon atoms which are immediately consecutive, said first pair being separated from the second pair by at least one carbon atom; and subsequently curing the ester-tetramine reaction product at a temperature of 100° to 525° C.

2. The process of claim 1 further limited in that Z is hydrogen.

3. The process of claim 1 further limited in that Z is alkyl.

4. The process of claim 1 further limited in that R is selected from the class consisting of (I)

(II) 

and (III) 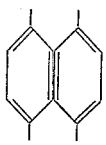

R' is ethylene; R" is

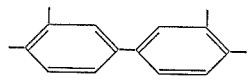

Y and Y' taken separately are —OH, and when taken together Y and Y' stand for —O—; and Z is selected from the class consisting of hydrogen and methyl.

5. The process of claim 2 further limited in that R

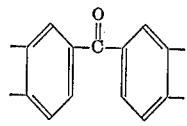

and Z is hydrogen.

6. The process of claim 2 further limited in that R

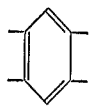

and Z is hydrogen.

7. The process of claim 2 further limited in that R

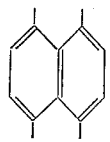

and Z is hydrogen.

8. The process of claim 2 further limited in that R

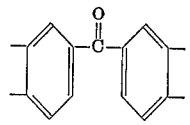

and Z is methyl.

9. The process defined in claim 1 further limited in that the nitrogenous polymer is deposited on a substrate before curing.

10. The process of making a laminate structure which comprises impregnating piles of an inorganic textile with the estertetramine reaction product defined in claim 1, and heating the impregnated piles at a temperature of 100° C. to 525° C. to cure the reaction product to a nitrogenous polymer.

References Cited

Bell et al., Polyimidazopyrrolones: A New Route to Ladder Polymers, Journal of Polymer Science, vol. 3, pp. 977–984, December 1965.

WILLIAM H. SHORT, *Primary Examiner.*

L. L. LEE, *Assistant Examiner.*

U.S. Cl. X.R.

161—197, 227; 260—47, 78, 78.4

UNITED STATES PATENT OFFICE
CERTIFICATE OF CORRECTION

Patent No. 3,435,004                    Dated March 25, 1969

Inventor(s) Clayton E. Hathaway, Ralph E. DeBrunner & John M. Butler

It is certified that error appears in the above-identified patent and that said Letters Patent are hereby corrected as shown below:

Column 8, claim 4, line 72, "$\overset{O}{\underset{}{C}}$" should be --- $\overset{O}{\underset{C}{\|}}$ ---. Column 9, claim 5, line 22, claim 6, line 29 and column 10, claim 7, line 1, claim 8, line 9, after "R" add --- is ---.

Signed and sealed this 23rd day of January 1973.

(SEAL)
Attest:

EDWARD M. FLETCHER, JR.
Attesting Officer

ROBERT GOTTSCHALK
Commissioner of Patents